(12) United States Patent
Harada et al.

(10) Patent No.: US 10,493,536 B2
(45) Date of Patent: Dec. 3, 2019

(54) ROTARY TOOL

(71) Applicant: SUMITOMO ELECTRIC HARDMETAL CORP., Itami-shi (JP)

(72) Inventors: Gaku Harada, Itami (JP); Yasuyuki Kanada, Itami (JP); Kouji Shimanuki, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 0 days.

(21) Appl. No.: 15/773,263

(22) PCT Filed: Sep. 7, 2016

(86) PCT No.: PCT/JP2016/076278
§ 371 (c)(1),
(2) Date: May 3, 2018

(87) PCT Pub. No.: WO2017/090297
PCT Pub. Date: Jun. 1, 2017

(65) Prior Publication Data
US 2018/0318939 A1    Nov. 8, 2018

(30) Foreign Application Priority Data
Nov. 26, 2015    (JP) .................................. 2015-230799

(51) Int. Cl.
*B23B 51/00*    (2006.01)
*B23C 5/16*    (2006.01)
(Continued)

(52) U.S. Cl.
CPC ................ *B23B 51/00* (2013.01); *B23C 5/16* (2013.01); *B23C 5/165* (2013.01); *B23D 77/00* (2013.01);
(Continued)

(58) Field of Classification Search
CPC . B23B 51/00; B23B 2226/31; B23B 2251/48; B23D 77/00; B23D 2277/26;
(Continued)

(56) References Cited

U.S. PATENT DOCUMENTS 4,087,193 A * 5/1978 Mundy ................. B23B 27/141
                                                    407/114
5,209,613 A * 5/1993 Nishio .................... B23B 27/20
                                                    407/119
(Continued)

FOREIGN PATENT DOCUMENTS

CN       102905824 A       1/2013
EP           112136 A2 *   6/1984
(Continued)

*Primary Examiner* — Eric A. Gates
(74) *Attorney, Agent, or Firm* — Baker Botts L.L.P.; Michael A. Sartori

(57) ABSTRACT

There is provided a rotary tool including a rotary tool body and a blade provided to the rotary tool body and having a cutting edge, the blade containing 80% by volume or more of diamond, and the blade including a land surface extending along the cutting edge, and a chip breaker having a recess located opposite to the cutting edge with the land surface therebetween.

8 Claims, 5 Drawing Sheets

(51) Int. Cl.
*B23D 77/00* (2006.01)
*B23C 5/10* (2006.01)

(52) U.S. Cl.
CPC ....... *B23B 2226/31* (2013.01); *B23B 2251/48* (2013.01); *B23C 5/10* (2013.01); *B23C 2200/087* (2013.01); *B23D 2277/26* (2013.01); *Y10T 408/81* (2015.01)

(58) Field of Classification Search
CPC ......... Y10T 408/81; B23C 5/16; B23C 5/165; B23C 2200/087
See application file for complete search history.

(56) References Cited

U.S. PATENT DOCUMENTS

| | | | | |
|---|---|---|---|---|
| 5,302,060 | A * | 4/1994 | Nystrom | B23B 27/1603 407/116 |
| 5,816,754 | A * | 10/1998 | Shallenberger | B23B 51/048 408/227 |
| 5,967,710 | A * | 10/1999 | Krenzer | B23B 27/141 407/114 |
| 7,322,776 | B2 * | 1/2008 | Webb | B23B 27/145 407/113 |
| 7,942,063 | B2 * | 5/2011 | Gao | B23B 29/125 73/760 |
| 9,441,312 | B2 * | 9/2016 | Ueda | C30B 29/04 |
| 10,183,337 | B2 * | 1/2019 | Patten | B23B 41/00 |
| 2003/0133763 | A1 * | 7/2003 | Kuroda | B23C 5/00 407/40 |
| 2007/0228879 | A1 * | 10/2007 | Imai | B23B 29/125 310/323.01 |
| 2010/0322732 | A1 * | 12/2010 | Mergenthaler | B23B 51/048 408/229 |
| 2012/0207869 | A1 * | 8/2012 | Imai | B23C 3/20 425/175 |
| 2015/0176155 | A1 | 6/2015 | Ueda et al. | |
| 2016/0243624 | A1 * | 8/2016 | Tomoda | B23B 27/143 |

FOREIGN PATENT DOCUMENTS

| | | |
|---|---|---|
| EP | 2 570 211 A1 | 3/2013 |
| EP | 3189917 A1 | 12/2017 |
| JP | H04-217404 A | 8/1992 |
| JP | H04-217405 A | 8/1992 |
| JP | H04-217406 A | 8/1992 |
| JP | 2001239412 A * | 9/2001 |
| JP | 2002307221 A * | 10/2002 |
| JP | 2003062712 A * | 3/2003 |
| JP | 2003165009 A * | 6/2003 |
| JP | 2006341321 A * | 12/2006 |
| JP | 2007-007736 A | 1/2007 |
| JP | 2007216327 A * | 8/2007 |
| JP | 2008229838 A * | 10/2008 |
| JP | 2010036296 A * | 2/2010 |
| JP | 2012-045635 A | 3/2012 |
| JP | 2012-101305 A | 5/2012 |
| WO | 2013/142885 A1 | 10/2013 |
| WO | 2014/003110 A1 | 1/2014 |

* cited by examiner

ROTARY TOOL

TECHNICAL FIELD

The present invention relates to a rotary tool, and more particularly to a rotary cutting tool such as a reamer, an end mill and a drill comprising a blade including diamond.

The present application claims priority based on Japanese Patent Application No. 2015-230799 filed on Nov. 26, 2015, and incorporates herein all the contents described therein.

BACKGROUND ART

In order to enhance chip processability in cutting, a cutting tool such as a rotary tool is provided with a chip breaker such as a breaker groove and a breaker wall. For example, Japanese Patent Laying-Open No. 4-217404 (PTD 1), Japanese Patent Laying-Open No. 4-217405 (PTD 2), and Japanese Patent Laying-Open No. 4-217406 (PTD 3) disclose defining a chip breaker in surface roughness to curl chips spirally.

CITATION LIST

Patent Documents

PTD 1: Japanese Patent Laying-Open No. 4-217404
PTD 2: Japanese Patent Laying-Open No. 4-217405
PTD 3: Japanese Patent Laying-Open No. 4-217406

SUMMARY OF INVENTION

The present invention in one aspect provides a rotary tool comprising a rotary tool body and a blade provided to the rotary tool body and having a cutting edge, the blade containing 80% by volume or more of diamond, and the blade comprising a land surface extending along the cutting edge, and a chip breaker having a recess located opposite to the cutting edge with the land surface therebetween.

DESCRIPTION OF EMBODIMENTS

Figure 1:
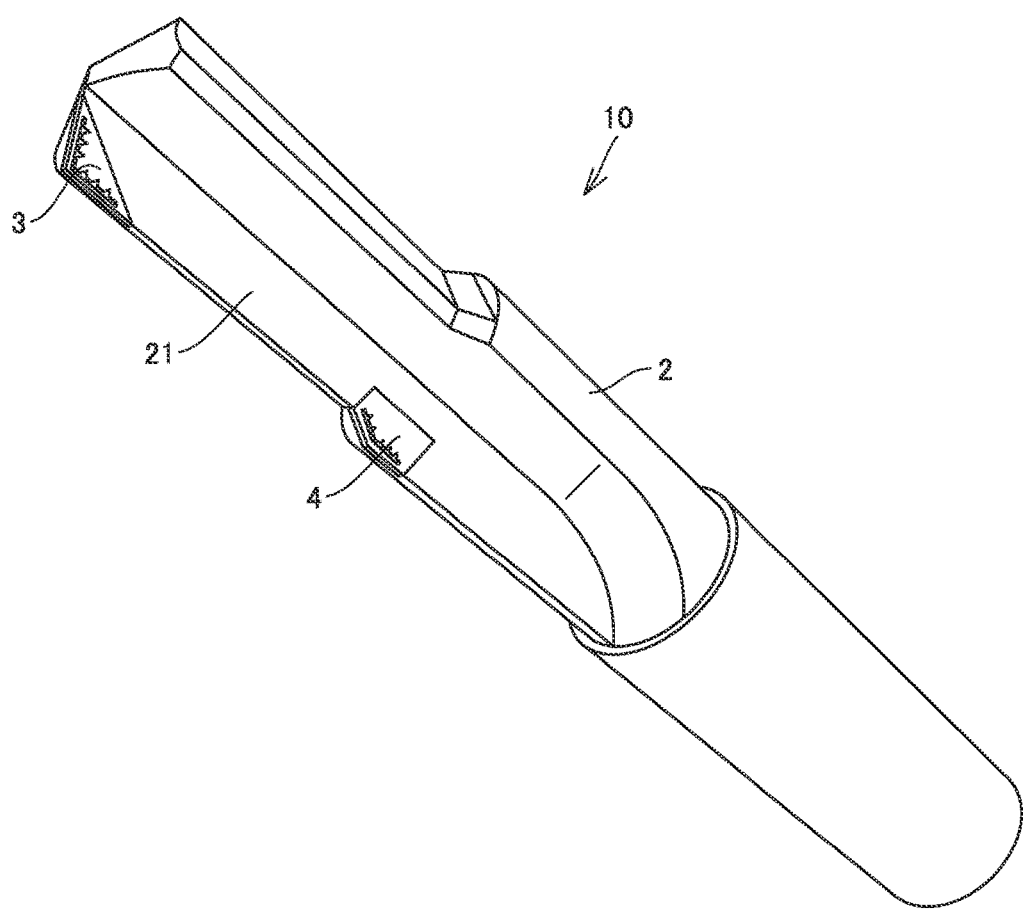
FIG. 1 is a schematic perspective view showing an example of a rotary tool according to one embodiment of the present invention.

Problem to be Solved by the Present Disclosure

PTDs 1-3 describe forming a chip breaker by electro-discharge machining or grinding, and accordingly, the chip breaker is shaped in the form of a simple groove. Accordingly, depending on the working condition(s), it cannot curl chips spirally and cannot obtain desired chip processability. Furthermore, the chip breaker formed by electro-discharge machining has a blade with a rake face which is an electro-discharge machined surface, and the blade's cutting edge cannot be formed sharply. Thus, when the rotary tools disclosed in PTDs 1-3 are used to work a workpiece, the workpiece has poor finished surface roughness.

Furthermore, diamond is used for a blade to improve a rotary tool in strength and wear resistance. However, diamond has large hardness and is thus not easily processed, and thus it is also difficult to use it to form a chip breaker excellent in chip processability.

Accordingly, the present invention contemplates a rotary tool which includes a blade containing diamond and is excellent in chip processability.

Effect of Present Disclosure

In this manner, there can be provided a rotary tool which includes a blade containing diamond and is excellent in chip processability.

DESCRIPTION OF EMBODIMENT OF THE PRESENT INVENTION

Initially, embodiments of the present invention are enumerated and described.

[1] The present invention in one aspect provides a rotary tool comprising a rotary tool body and a blade provided to the rotary tool body and having a cutting edge, the blade containing 80% by volume or more of diamond, and the blade comprising a land surface extending along the cutting edge, and a chip breaker having a recess located opposite to the cutting edge with the land surface therebetween. The rotary tool in one aspect of the present invention has excellent chip processability.

Preferably, the rotary tool in one aspect of the present invention has the recess with a side surface having a rake face that recedes continuously as a distance thereof from the land surface increases in magnitude and that has a shape identical to that of a portion of a side surface of a shape of a body of revolution. The rotary tool that has a blade including a chip breaker having a recess with a side surface having a rake face that recedes continuously as a distance thereof from the land surface increases in magnitude and that has a shape identical to that of a portion of a side surface of a shape of a body of revolution, allows a workpiece to be cut such that chips flow out along the rake face of the chip breaker toward the bottom of the rake face and large distortion can thus be imparted to the chips. The rotary tool according to one aspect of the present invention can thus exhibit excellent chip processability under a variety of cutting conditions. Furthermore, the rotary tool according to one aspect of the present invention has a blade containing 80% by volume or more of diamond and hence excellent in strength and wear resistance.

[2] In the rotary tool in one aspect of the present invention, preferably, an angle of inclination of the rake face relative to the land surface is in a range of 15° or more and 50° or less. This allows cutting to be done with chips easily flowing out along the rake face and thus enhances the rotary tool's chip processability. Furthermore, it can also maintain the strength of the cutting edge of the blade and thus also enhance the rotary tool in longevity as a tool.

[3] In the rotary tool in one aspect of the present invention, preferably, the land surface has a width in a range of 10 μm or more and 100 μm or less in a direction perpendicular to the cutting edge. This allows cutting to be done while preventing chips from running up onto the land surface and thus enhances the rotary tool's chip processability. Furthermore, it can also maintain the strength of the cutting edge of the blade and thus also enhance the rotary tool in longevity as a tool. Note that the direction perpendicular to the cutting edge means a direction along a straight line which is perpendicular to the cutting edge and is also located on the land surface. Note that if the cutting edge is curved, the direction means a direction along a straight line which is perpendicular to a tangent of the curve and is also located on the land surface.

[4] In the rotary tool in one aspect of the present invention, preferably, the recess has a maximum depth in a range of 60 μm or more and 300 μm or less. This allows cutting to be done with distortion effectively imparted to chips and thus enhances the rotary tool's chip processability.

[5] In the rotary tool in one aspect of the present invention, preferably, the recess has a width in a range of 0.2 mm or more and 1.0 mm or less in a direction perpendicular to the cutting edge. This allows chips flowing out in cutting to collide against an inclined surface that is raised from a rear end of the rake face of the recess of the chip breaker toward an upper surface of the blade (hereinafter also referred to as the breaker's wall surface), without running up onto the upper surface of the blade, to help to shred the chips and thus enhance the rotary tool's chip processability.

[6] In the rotary tool in one aspect of the present invention, preferably, the land surface has a surface roughness in a range of 0.05 μm or more and 0.2 μm or less, and the rake face has a surface roughness in a range of 2 μm or more and 7 μm or less. The land surface having a surface roughness in a range of 0.05 μm or more and 0.2 μm or less allows the blade to have a cutting edge formed sharply to thus provide a workpiece with satisfactory finished surface roughness. Furthermore, the rake face having a surface roughness in a range of 2 μm or more and 7 μm or less increases resistance caused when the chips having flown out in cutting scratch the surface of the rake face, and the chips are easily curled and the rotary tool's chip processability is thus improved.

[7] In the rotary tool in one aspect of the present invention, preferably, the diamond is single crystal diamond, single crystal diamond synthesized through vapor deposition, in particular. Single crystal diamond is excellent in strength and wear resistance, and the rotary tool can have excellent wear resistance and have a cutting edge with sharpness (i.e., edge sharpening performance).

[8] In the rotary tool in one aspect of the present invention, preferably, the single crystal diamond has an absorption coefficient in a range of 2 cm$^{-1}$ or more and 90 cm$^{-1}$ or less for laser light of 190 nm or more and 11000 nm or less in wavelength. The single crystal diamond having an absorption coefficient in a range of 2 cm$^{-1}$ or more and 90 cm$^{-1}$ or less easily absorbs laser light. The single crystal diamond can thus be easily laser-machined to provide a blade with a chip breaker shaped as desired to thus enhance the rotary tool's chip processability.

Details of Embodiment of the Present Invention

A specific example of a rotary tool according to an embodiment of the present invention will now be described with reference to the drawings below.

FIG. 1 is a schematic perspective view of a rotary tool 10 according to one embodiment of the present invention.

While rotary tool 10 shown in FIG. 1 is provided in the form of a reamer, it is not limited as such, and may have other general forms such as a drill, an end mill, etc. That is, the rotary tool according to the present invention generally includes rotary tools (drills, end mills, reamers, etc.) brought into contact with a workpiece while rotating about its axis to cut the workpiece. As shown in FIG. 1, rotary tool 10 according to the present embodiment includes a rotary tool body 2 and blades 3 and 4 provided to rotary tool body 2. Rotary tool 10 may have only one of blades 3 and 4.

Rotary tool body 2 can be formed of material such as steel, cemented carbide, etc for example. Rotary tool body 2 has an external shape in the form of a column generally extending in its axial direction, and has a groove 21 formed from a tip end portion of rotary tool body 2 to an intermediate portion thereof. Notches are provided at the locations of the tip end and intermediate portions, respectively, of groove 21 facing a peripheral surface of rotary tool body 2 for accommodating blades 3 and 4, respectively. These notches are opened at a groove surface of groove 21 and a peripheral surface of rotary tool body 2.

Blade 3 is accommodated in and fixed to the notch of the tip end portion of rotary tool body 2, and blade 4 is accommodated in and fixed to the notch of the intermediate portion of rotary tool body 2.

Figure 2:
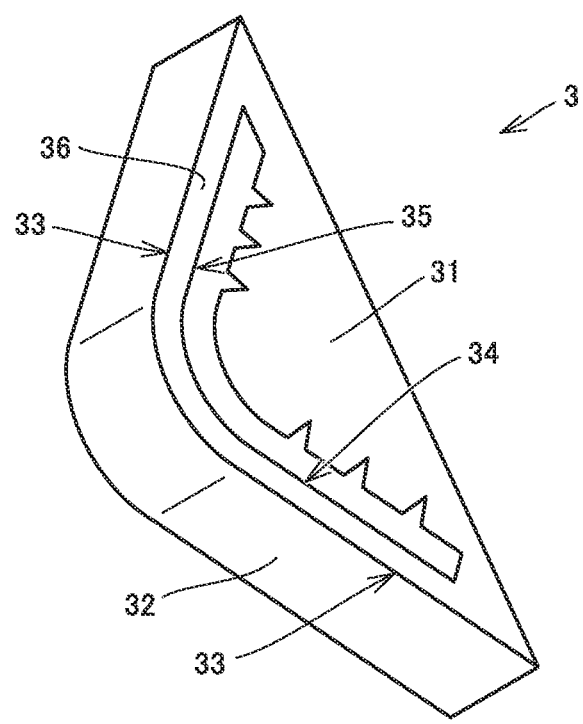
FIG. 2 is a schematic perspective view showing an example of a blade applied to a rotary tool according to one embodiment of the present invention.

As shown in FIGS. 1 and 2, blade 3 has an upper surface 31 flush with the groove surface of groove 21 when blade 3 is accommodated in the notch of the tip end portion of rotary tool body 2, a bottom surface opposite to upper surface 31, and a side surface 32 connecting a periphery of upper surface 31 and a periphery of the bottom surface. A portion of side surface 32 corresponding to the opening of the notch of rotary tool body 2 is flush with a peripheral surface of rotary tool body 2.

Figure 3:
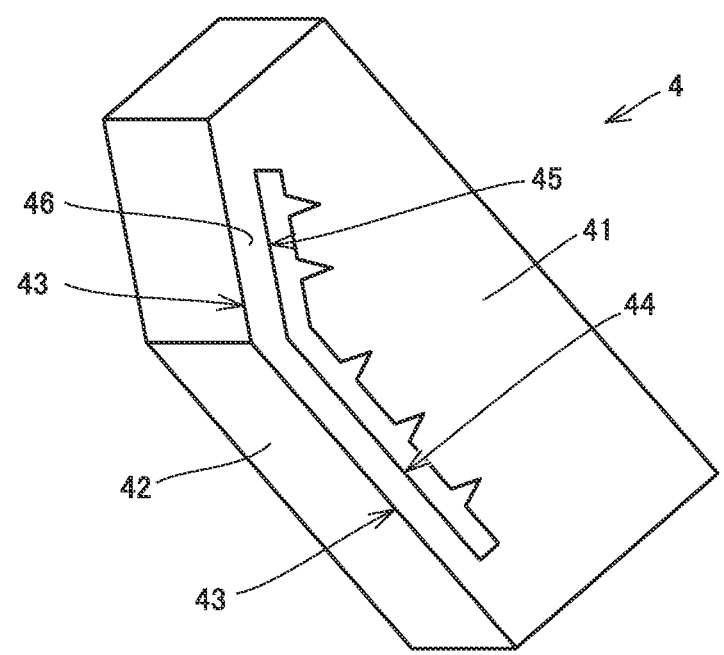
FIG. 3 is a schematic perspective view showing another example of the blade applied to the rotary tool according to one embodiment of the present invention.

As shown in FIGS. 1 and 3, blade 4 has an upper surface 41 flush with the groove surface of groove 21 when blade 4 is accommodated in the notch of the intermediate portion of rotary tool body 2, a bottom surface opposite to upper surface 41, and a side surface 42 connecting a periphery of upper surface 41 and a periphery of the bottom surface. A portion of side surface 42 corresponding to the opening of the notch of rotary tool body 2 is flush with a peripheral surface of rotary tool body 2.

As shown in FIG. 2, of the sides configuring the periphery of upper surface 31 of blade 3, a side formed by a ridge line of a position at which the blade 3 upper surface 31 and side surface 32 cross each other configures a cutting edge 33. Furthermore, as shown in FIG. 3, of the sides configuring the periphery of upper surface 41 of blade 4, a side formed by a ridge line of a position at which the blade 4 upper surface 41 and side surface 42 cross each other configures a cutting edge 43.

As shown in FIG. 2, at blade 3, a chip breaker 34 is formed to extend along the ridge line of the position at which the blade 3 upper surface 31 and side surface 32 cross each other. Chip breaker 34 includes a recess 35 formed along cutting edge 33. Furthermore, as shown in FIG. 3, at blade 4, a chip breaker 44 is formed to extend along the ridge line of the position at which the blade 4 upper surface 41 and side surface 42 cross each other. Chip breaker 44 includes a recess 45 formed along cutting edge 43.

Blades 3 and 4 contain 80% by volume or more of diamond. Diamond is excellent in strength and wear resistance, and the blades containing diamond can be excellent in strength and wear resistance, and can enhance the chip breakers and hence the tool in longevity. Preferably, blades 3 and 4 have a diamond content of 90% by volume or more, more preferably 95% by volume or more.

The diamond can be a sintered diamond material of sintered powdery diamond, single crystal diamond synthesized through chemical vapor deposition (CVD), etc. When the diamond sintered material is used for blades 3 and 4, the blades can present excellent wear resistance in working of nonferrous metal in particular, and can provide a satisfactory finished surface. When the single crystal diamond synthesized through CVD is used for blades 3 and 4, the blades can present excellent wear resistance and have a cutting edge with sharpness (i.e., edge sharpening performance).

Preferably, the single crystal diamond has an absorption coefficient in a range of 2 $cm^{-1}$ or more and 90 $cm^{-1}$ or less for a laser wavelength in a wavelength range of 190 nm or more and 11000 nm or less. When the single crystal diamond has an absorption coefficient in said range, it easily absorbs laser light, which helps laser-machining of blades 3 and 4. This allows blades 3 and 4 to be worked to have a desired contour and the chip breakers to be formed at blades 3 and 4 with high precision. When the laser wavelength is 1064 nm, it is more preferable that the single crystal diamond have an absorption coefficient in a range of 5 $cm^{-1}$ or more and 20 $cm^{-1}$ or less. When the laser wavelength is 532 nm, it is more preferable that the single crystal diamond have an absorption coefficient in a range of 30 $cm^{-1}$ or more and 70 $cm^{-1}$ or less. When the laser wavelength is 355 nm, it is more preferable that the single crystal diamond have an absorption coefficient in a range of 60 $cm^{-1}$ or more and 90 $cm^{-1}$ or less.

As shown in FIG. 2, blade 3 has upper surface 31 with a land surface 36 formed to extend along cutting edge 33. Land surface 36 has a determined width W11 from cutting edge 33 along upper surface 31 (see FIG. 4). Furthermore, as shown in FIG. 3, blade 4 has upper surface 41 with a land surface 46 formed to extend along cutting edge 43. Land surface 46 has a determined width W12 from cutting edge 43 along upper surface 41 (see FIG. 5).

Land surfaces 36 and 46 preferably have widths W11 and W12, respectively, in a range of 10 μm or more and 100 μm or less. Having widths W11 and W12 of 10 μm or more allows the blades to have their cutting edges with strength maintained and can prevent the cutting edges from chipping and thus enhance the rotary tool in longevity as a tool. Having widths W11 and W12 of 100 μm or less allows cutting to be done while preventing chips from running up onto land surfaces 36 and 46 and thus being large in length and enhances the rotary tool's chip processability. More preferably, widths W11 and W12 are 10 μm or more and 70 μm or less.

Preferably, land surfaces 36, 46 have a surface roughness in a range of 0.05 μm or more and 0.2 μm or less. This allows the blades to have cutting edges formed sharply and thus provides a workpiece with satisfactory finished surface roughness. Herein, surface roughness is a ten-point average roughness (Rz) according to JIS B 0031:1994. More specifically, it is a value that is obtained in a portion extracted from a profile curve only by a reference length and represents a difference between an average value of the highest to fifth highest peaks' altitudes and an average value of the deepest to fifth deepest troughs' altitudes, as represented in micrometers (μm). More preferably, land surfaces 36, 46 have a surface roughness in a range of 0.08 μm or more and 0.15 μm or less.

Figure 4:
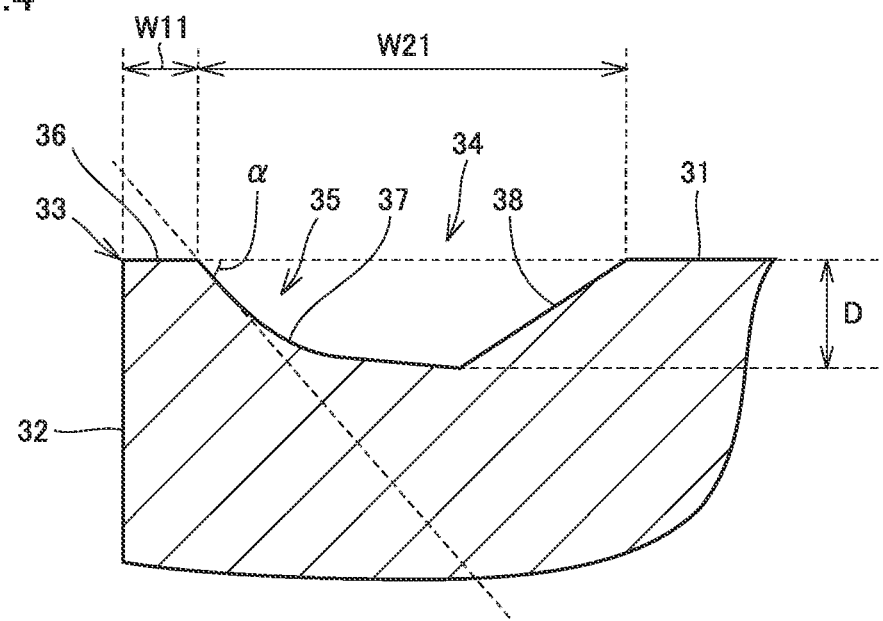
FIG. 4 is a partial cross-sectional view showing an example of a blade applied to a rotary tool according to one embodiment of the present invention.

As shown in FIGS. 2 and 4, blade 3 has upper surface 31 with chip breaker 34 formed opposite to cutting edge 33 with land surface 36 therebetween and having recess 35. Herein, recess 35 is a portion of chip breaker 34 that is formed along cutting edge 33 in a vicinity of a corner. A side surface which forms an outer contour of recess 35 includes a rake face 37 which recedes continuously from land surface 36 as a distance toward the center of blade 3 increases in magnitude, and a breaker wall surface 38 which is raised from a rear end of rake face 37 toward upper surface 31 of blade 3. This allows chips flowing out in cutting a workpiece to first flow out along rake face 37 toward the bottom of rake face 37. At the time, distortion is imparted to the chips and thus helps to shred the chips. Subsequently, the chips reach the bottom of rake face 37 and collide against breaker wall surface 38. At the time, the chips are shredded by the collision. Or the chips are shredded as further distortion is imparted thereto.

Figure 5:
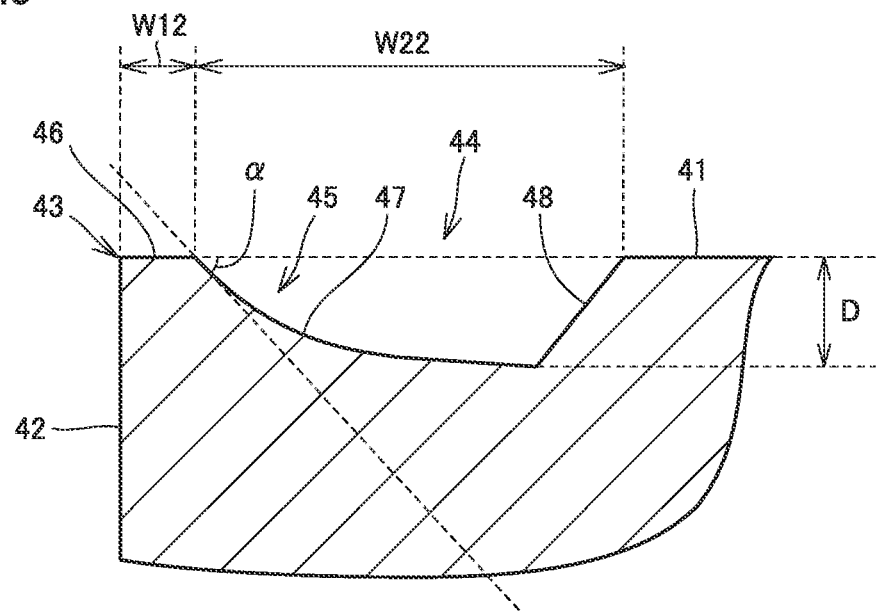
FIG. 5 is a partial cross-sectional view showing another example of the blade applied to the rotary tool according to one embodiment of the present invention.

Similarly, as shown in FIGS. 3 and 5, blade 4 has upper surface 41 with chip breaker 44 formed opposite to cutting edge 43 with land surface 46 therebetween and having recess 45. A side surface which forms an outer contour of recess 45 includes a rake face 47 which recedes continuously from land surface 46 as a distance toward the center of blade 4 increases in magnitude, and a breaker wall surface 48 which is raised from a rear end of rake face 47 toward upper surface 41 of blade 4.

Rake faces 37, 47 are identical in shape to a portion of a side surface of the shape of a body of revolution. According to this, in recesses 35, 45 of blades 3 and 4, in cutting a workpiece, chips flow out along rake faces 37, 47 of the chip breakers toward the bottoms of rake faces 37, 47, and large distortion can be imparted to the chips. Herein, the shape of the body of revolution means a solid that can be formed around a plane figure by revolving the plane figure once with a straight line on its plane serving as an axis of revolution. The shape of the body of revolution includes a sphere, a cone, etc., for example. When the shape of the body of revolution has the axis on a bisector of the corner angle of blade 3, 4, chips flow toward the maximum depth of the bottom located under the bisector of the corner angle, and larger distortion can be imparted to the chips. Preferably, rake faces 37, 47 have a shape identical to a portion of a side surface of a cone. This can maintain the cutting edges' strength.

As shown in FIGS. 4 and 5, an angle of inclination α of rake faces 37, 47 relative to land surfaces 36, 46 is preferably in a range of 15° or more and 50° or less. This allows cutting to be done with chips easily flowing out along rake faces 37, 47 and thus enhances the rotary tool's chip processability. Furthermore, it can also maintain the strength of the cutting edges of blades 3 and 4 and thus also enhance the rotary tool in longevity as a tool. Note that angle of inclination α of rake faces 37, 47 relative to land surfaces 36, 46 means an angle formed by land surfaces 36, 46 and rake faces 37, 47 that is an acute angle. Angle of inclination α of rake faces 37, 47 relative to land surfaces 36, 46 is more preferably 20° or more and 40° or less.

Rake faces 37, 47 preferably have a surface roughness in a range of 2 μm or more and 7 μm or less. This increases resistance caused when chips flowing out in cutting scratch the surfaces of rake faces 37, 47, and the chips are easily curled and the rotary tool's chip processability is thus improved. Herein, surface roughness is a ten-point average roughness (Rz) according to JIS B 0031:1994. Rake faces 37, 47 more preferably have a surface roughness in a range of 3.0 μm or more and 6.0 μm or less.

As shown in FIGS. 4 and 5, recesses 35, 45 preferably have a maximum depth D in a range of 60 μm or more and 300 μm or less. This allows cutting to be done with distortion effectively imparted to chips and thus enhances the rotary tool's chip processability. Note that maximum depth D of recesses 35, 45 is a maximum value of a distance to the bottoms of the recesses from land surfaces 36, 46 in a direction perpendicular to the land surfaces. More preferably, recesses 35, 45 have maximum depth D in a range of 60 μm or more and 200 μm or less.

As shown in FIGS. 4 and 5, recesses 35, 45 preferably have widths W21, W22, respectively, in a direction perpendicular to cutting edges 33, 43, respectively, (hereinafter also referred to as a "width of the recess") in a range of 0.2 mm or more and 1.0 mm or less. This allows chips flowing out in cutting to collide against breaker wall surfaces 38, 48, without running up onto upper surfaces 31, 41 of blades 3 and 4, to help to shred the chips and thus enhance the rotary tool's chip processability. Note that width W21, W22 in the direction perpendicular to cutting edge 33, 43 (the width of the recess) means a distance between an end of the opening of the recess closer to the land surface and an end of the opening of the recess closer to the center of the blade, as seen in a direction along a straight line which is perpendicular to cutting edge 33, 43 and is also located on the top plane of the recess (in other words, a plane assumed when the land surface is extended to above the recess). Note that if the cutting edge is curved, the width means a distance between an end of the opening of the recess closer to the land surface and an end of the opening of the recess closer to the center of the blade, as seen in a direction along a straight line which is perpendicular to a tangent of the curve and is also located on the top plane of the recess. Recesses 35, 45 more preferably have widths W21, W22 in a direction perpendicular to cutting edges 33, 43 (the width of the recess) in a range of 0.25 mm or more and 0.7 mm or less.

An example of a method for manufacturing rotary tool 10 of the present embodiment will now be described. Rotary tool body 2 having notches, and blades 3 and 4 containing 80% by volume or more of diamond are prepared. Blades 3 and 4 are brazed to the notches of rotary tool body 2, and ground with a diamond wheel to have cutting edges. Subsequently, a high output pulsed laser is used to work surfaces of blades 3 and 4 to form chip breakers 34 and 44. Conventionally, a blade containing diamond has been worked by electro-discharge machining, grinding or the like, which limits a chip breaker to a simple shape. In contrast, in the present embodiment, blades 3 and 4 are worked with precise positioning done via laser irradiation, which can provide chip breakers 34 and 44 in a desire shape. In particular, the shapes of recesses 35, 45 of the chip breakers existing along cutting edges 33, 43 can be precisely adjusted, and the rotary tool's chip processability can be enhanced.

EXAMPLE

The present invention will now be more specifically described by way of example. However, the present invention is not limited to this example.

Example 1

In the present example, what effect the shape of the rake face of the recess has on chip processability and the amount of a flank (a surface which is flush with a peripheral surface of the rotary tool body) worn in cutting was investigated.

A polycrystalline hard sintered material containing 90% by volume of diamond having an average grain size of 0.5 μm, which served as a source of blades 3, 4, was brazed at notches of rotary tool body 2, and subsequently ground with a diamond wheel of #1500 to have cutting edges.

Subsequently, a high output pulse $YVO_4$: Nd laser enhanced in condensability by a galvanometer mirror (wavelength: 1,064 nm) was employed with an output of 1.5 W, an oscillatory frequency of 22 kHz and a working pitch of 1 μm to proceed to carve blades 3, 4 in contour lines in a constant working amount to form on upper surfaces of the rake faces of blades 3, 4 a shape of a chip breaker having a three-dimensionally shaped recesses and projections. A variety of samples with rake faces varied in shape as shown in table 1 were produced and accessed in chip processability. The cutting conditions and the tool's shape are indicated below. In this assessment, chips of a range of 5 mm or more and 300 mm or less in length were determined as being satisfactory. The assessment result is indicated in table 1.

(Cutting Conditions)
Workpiece: cylindrical aluminum alloy (A6061)
Cutting method: working to form a blind hole having a diameter of 18 (mm)×a length of 30 (mm)
Cutting manner: wet cutting
No. of holes formed: 300
Workpiece's circumferential surface speed: 100 (m/min)
Tool's machining allowance: 0.20 (mm)
Tool's feed rate: 0.20 (mm/rev)
(Tool's Shape)
Description of tool used: φ18.4, 2 blades (corner R 1.0), shank diameter 16
Blade's material: polycrystalline hard sintered material containing 90% by volume of diamond having an average grain size of 0.5 μm
Holder's description: BT50
Rake face's shape: identical to a portion of a shape indicated by that of a rake face indicated in table 1
Land surface's width (W11, W12): 0.07 (mm)
Recess's maximum depth (D): 0.1 (mm)
Recess's width (W21, W22): 0.7 (mm)
Rake face's surface roughness (Rz1): Rz3.2 (μm)
Land surface's surface roughness (Rz2): Rz0.06 (μm)
Breaker working condition: $YVO_4$: Nd laser (wavelength: 1,064 nm), with a frequency of 22 kHz, an output of 1.5 W, and a working pitch of 1 μm

TABLE 1

| sample nos. | shape of rake face | length of chip (mm) | amount of wearing of flank (cutting length: 10 km) (mm) |
|---|---|---|---|
| 1A | no chip breaker | not shredded | 0.011 |
| 1B | ball (R0.4) | 100-150 | 0.023 (chipping occurred depending on the case) |
| 1C | cone (angle of inclination α = 10°) | 150-250 | 0.012 |
| 1D | cone (angle of inclination α = 20°) | 80-130 | 0.014 |
| 1E | cone (angle of inclination α = 35°) | 80-130 | 0.014 |
| 1F | cone (angle of inclination α = 50°) | 80-130 | 0.016 |
| 1G | cone (angle of inclination α = 60°) | 80-130 | 0.032 (chipping occurred depending on the case) |

Sample 1A had a rake face without a chip breaker, and chips were not shredded and tangled with the workpiece. In contrast, samples 1B-1G had their rake faces in the form of a portion of a cone and provided chips having a length of 300 mm or less and hence satisfactory chip processability. Inter alia, samples 1D-1F had their rake faces with an angle of inclination of 15° or more and 50° or less relative to the land surface, and thus provided chips having a length of 80-130 mm and hence particularly satisfactory chip processability. Sample 1G had a rake face in the form of a cone and having an angle of inclination of 60° relative to the land surface, and provided chips having a satisfactory length of 80-130 mm, although it had the cutting edge chipped when 300 holes were formed. Sample 1B had a rake face in the form of a ball and provided chips having a satisfactory length of 100-150 mm, although it had the cutting edge chipped when 300 holes were formed.

Thus, it has been found that a rake face having a shape identical to a portion of a shape of a body of revolution such as a ball, a cone or the like allows chips to have a length of 300 mm or less and thus allows satisfactory chip processability. Inter alia, it has been found that a rotary tool having a rake face having a shape identical to a portion of a shape of a cone and an angle of inclination of 15° to 50° relative to the land surface allows chips to have a length of 80-130 mm and thus presents satisfactory chip processability, and as a tool it is increased in longevity as it did not have chipping even when 300 holes are formed.

It should be understood that the embodiment and example disclosed herein have been described for the purpose of illustration only and in a non-restrictive manner in any respect. The scope of the present invention is defined by the terms of the claims, rather than the embodiments description above, and is intended to include any modifications within the meaning and scope equivalent to the terms of the claims.

INDUSTRIAL APPLICABILITY

The rotary tool of the present embodiment is beneficial when it is used for tools and the like used in forming a mating hole in an aluminum alloy, nonferrous metal and the like and for end mills.

REFERENCE SIGNS LIST

2: rotary tool body; 3, 4: blade; 10: rotary tool 21: groove; 31, 41: upper surface of blade; 32, 42: side surface of blade; 33, 43: cutting edge; 34, 44: chip breaker 35, 45: recess; 36, 46: land surface; 37, 47: rake face; 38, 48: breaker's wall surface;

The invention claimed is:

1. A rotary tool comprising:
a rotary tool body; and
a blade provided to the rotary tool body and having a cutting edge,
the blade containing 80% by volume or more of diamond, and
the blade comprising a land surface extending along the cutting edge, and a chip breaker having a recess located opposite to the cutting edge with the land surface therebetween,
wherein the land surface has a width in a range of 10 μm or more and 100 μm or less,
wherein the recess has a maximum depth in a range of 60 μm or more and 300 μm or less.

2. The rotary tool according to claim 1, wherein the diamond is a single crystal diamond.

3. The rotary tool according to claim 2, wherein the single crystal diamond has an absorption coefficient in a range of 2 $cm^{-1}$ or more and 90 $cm^{-1}$ or less for laser light of 190 nm or more and 11000 nm or less in wavelength.

4. The rotary tool according to claim 1, wherein the recess has a side surface having a rake face that recedes continuously as a distance thereof from the land surface increases in magnitude and that has a shape identical to that of a portion of a side surface of a shape of a body of revolution.

5. A rotary tool comprising:
a rotary tool body; and
a blade provided to the rotary tool body and having a cutting edge,
the blade containing 80% by volume or more of diamond, and
the blade comprising a land surface extending along the cutting edge, and a chip breaker having a recess located opposite to the cutting edge with the land surface therebetween,
wherein the rotary tool body has an external shape in the form of a column generally extending in its axial direction, and has a groove formed from a tip end portion of the rotary tool body to an intermediate portion thereof,
wherein the blade is accommodated in a notch provided at the locations of the tip end and intermediate portions of the groove facing a peripheral surface of the rotary tool body,
wherein the land surface has a width in a range of 10 μm or more and 100 μm or less,
wherein the recess has a maximum depth in a range of 60 μm or more and 300 μm or less.

6. The rotary tool according to claim 5, wherein the diamond is a single crystal diamond.

7. The rotary tool according to claim 6, wherein the single crystal diamond has an absorption coefficient in a range of 2 $cm^{-1}$ or more and 90 $cm^{-1}$ or less for laser light of 190 nm or more and 11000 nm or less in wavelength.

8. The rotary tool according to claim 5, wherein the recess has a side surface having a rake face that recedes continuously as a distance thereof from the land surface increases in magnitude and that has a shape identical to that of a portion of a side surface of a shape of a body of revolution.

* * * * *